May 26, 1942.  H. A. STEVENSON  2,284,237
INDUSTRIAL TRUCK
Filed June 7, 1940  7 Sheets-Sheet 2
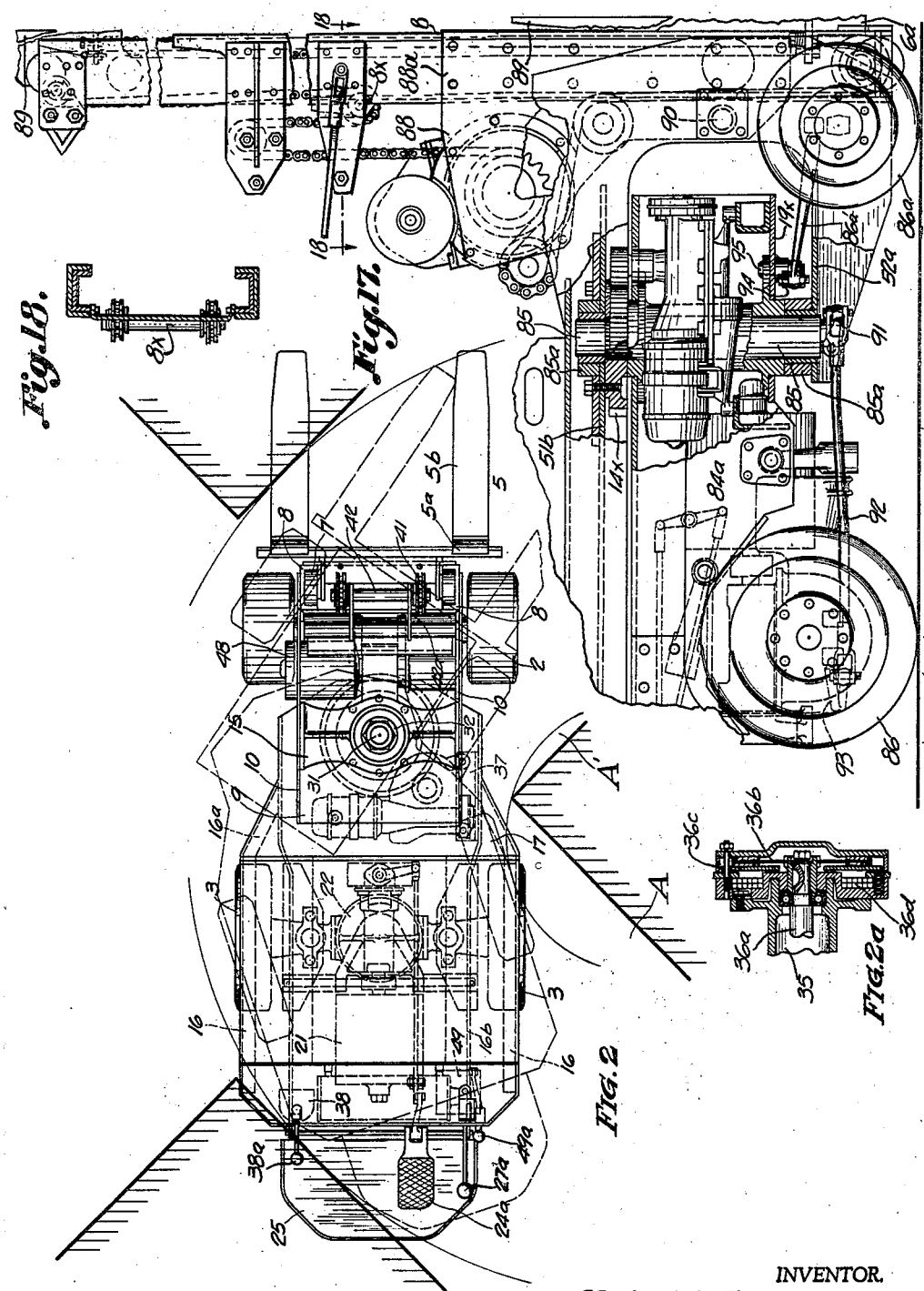
INVENTOR.
Herbert A. Stevenson
BY Geo. B. Pitts attorney

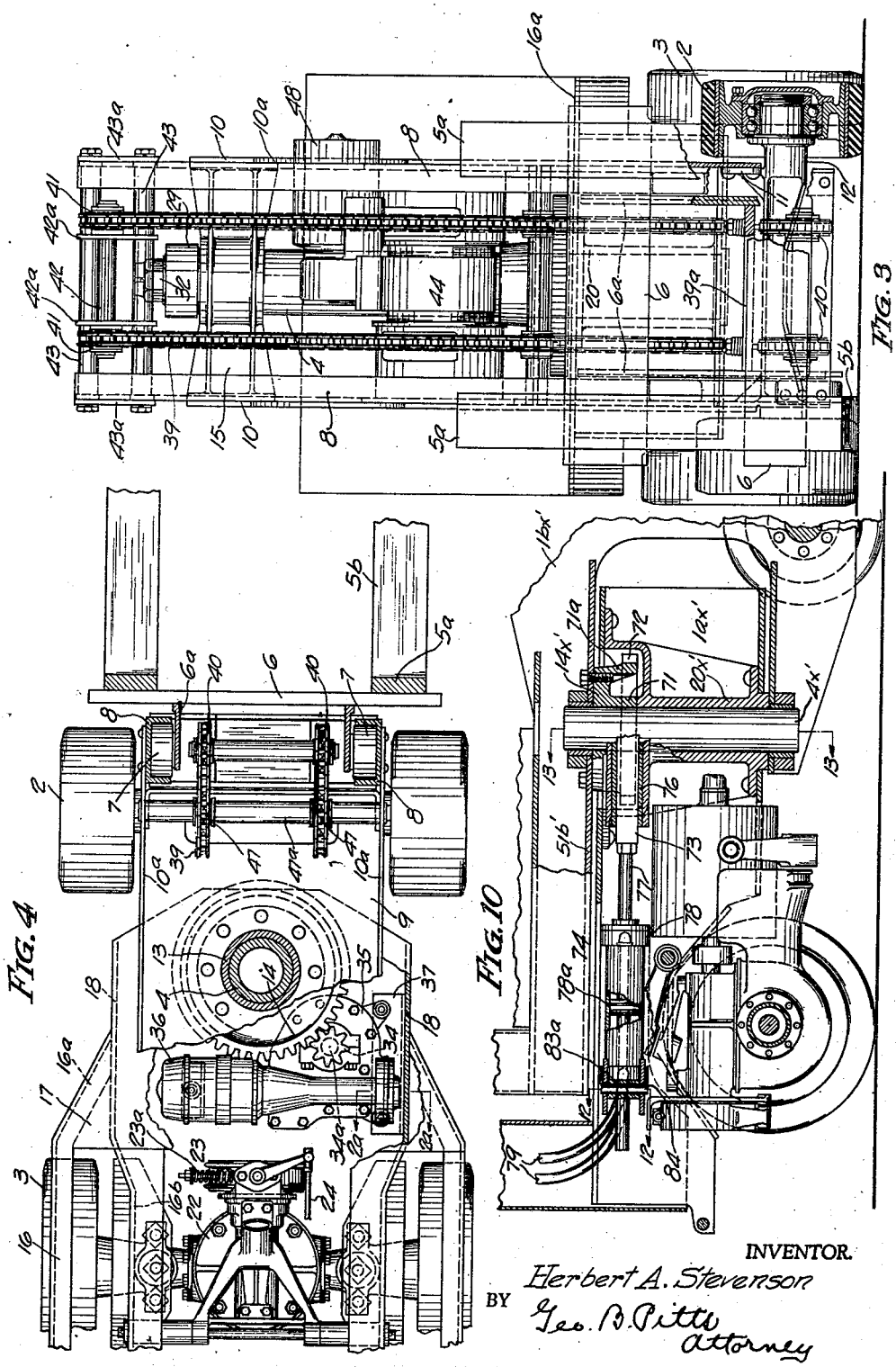

May 26, 1942.                H. A. STEVENSON                  2,284,237
                              INDUSTRIAL TRUCK
                            Filed June 7, 1940            7 Sheets-Sheet 4
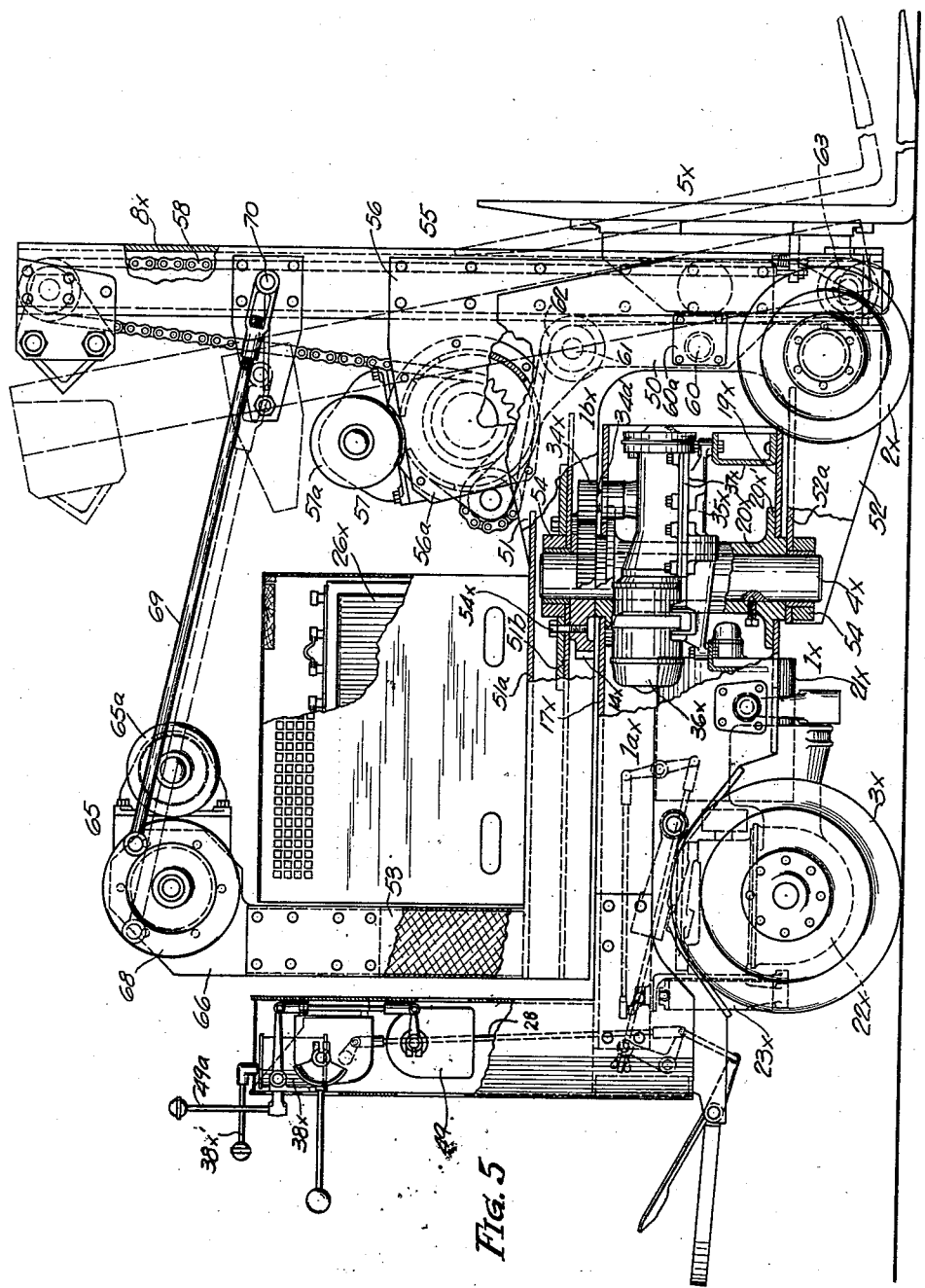
INVENTOR.
Herbert A. Stevenson
BY Geo. B. Pitts
   Attorney May 26, 1942. H. A. STEVENSON 2,284,237
INDUSTRIAL TRUCK
Filed June 7, 1940 7 Sheets-Sheet 5
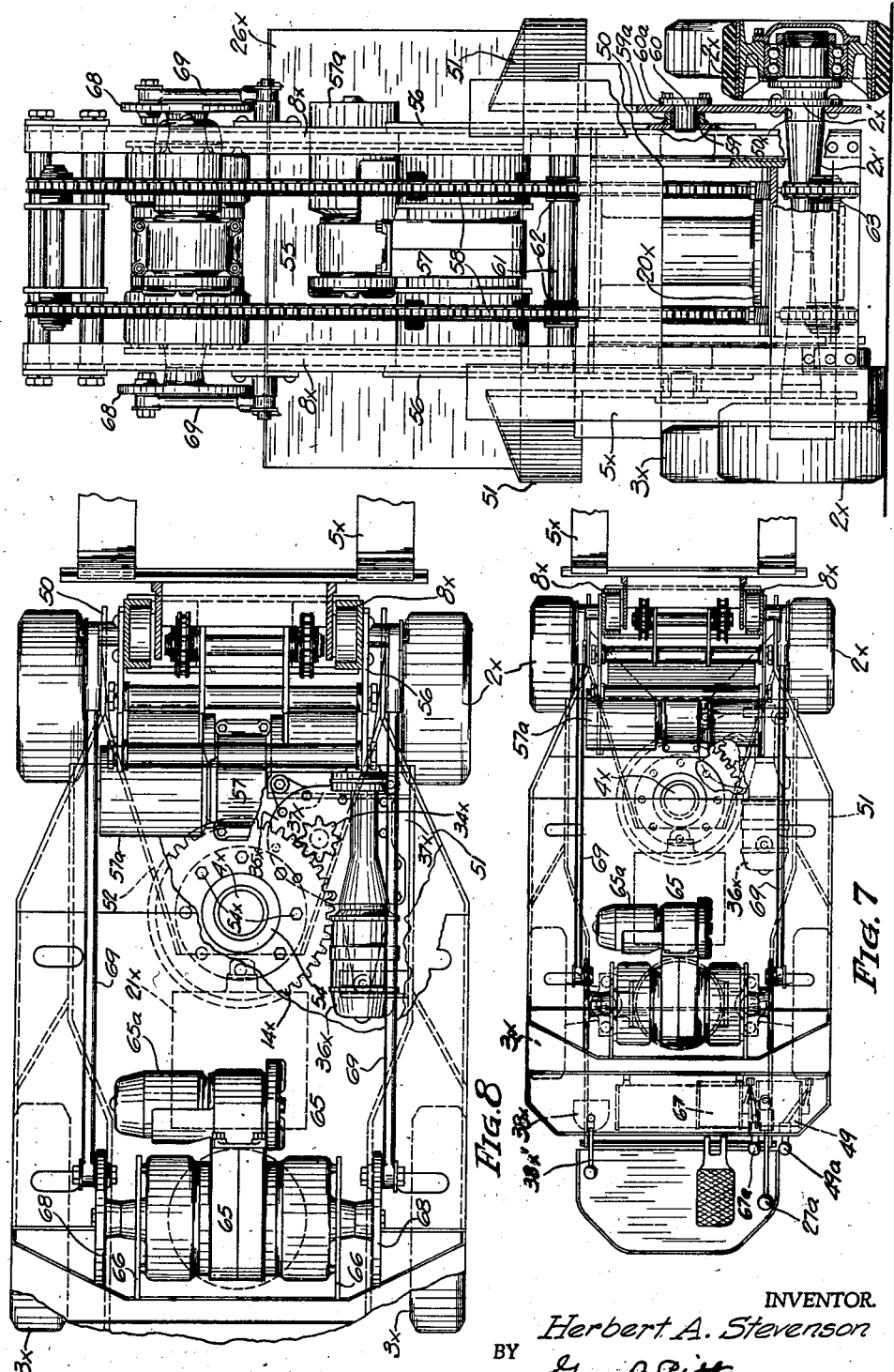
INVENTOR.
Herbert A. Stevenson
BY Geo. B. Pitts Attorney

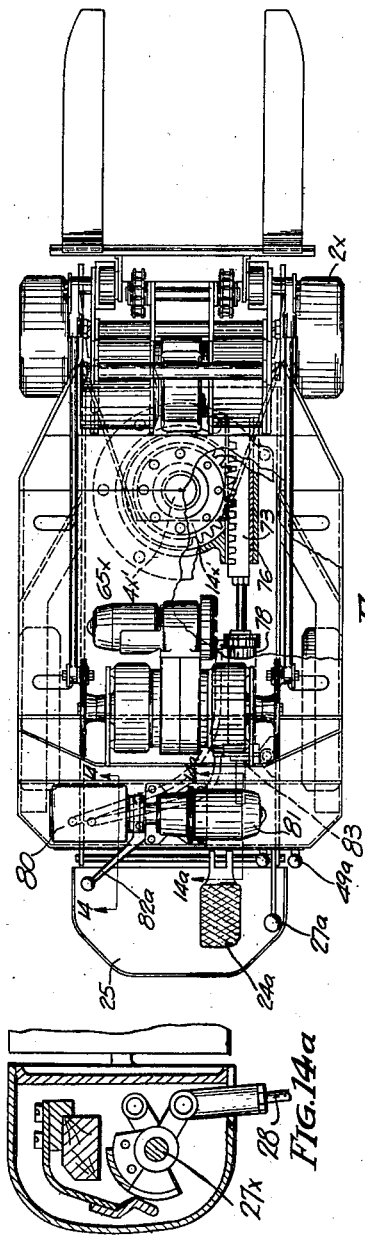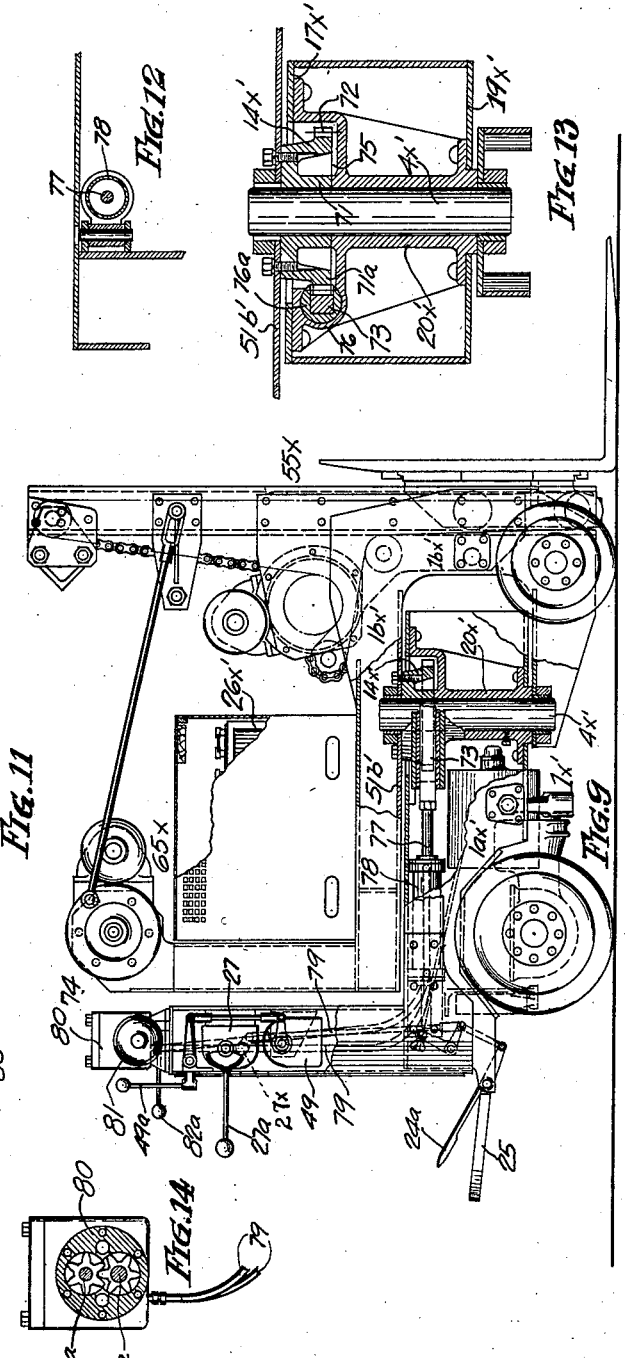

May 26, 1942.  H. A. STEVENSON  2,284,237
INDUSTRIAL TRUCK
Filed June 7, 1940  7 Sheets-Sheet 7
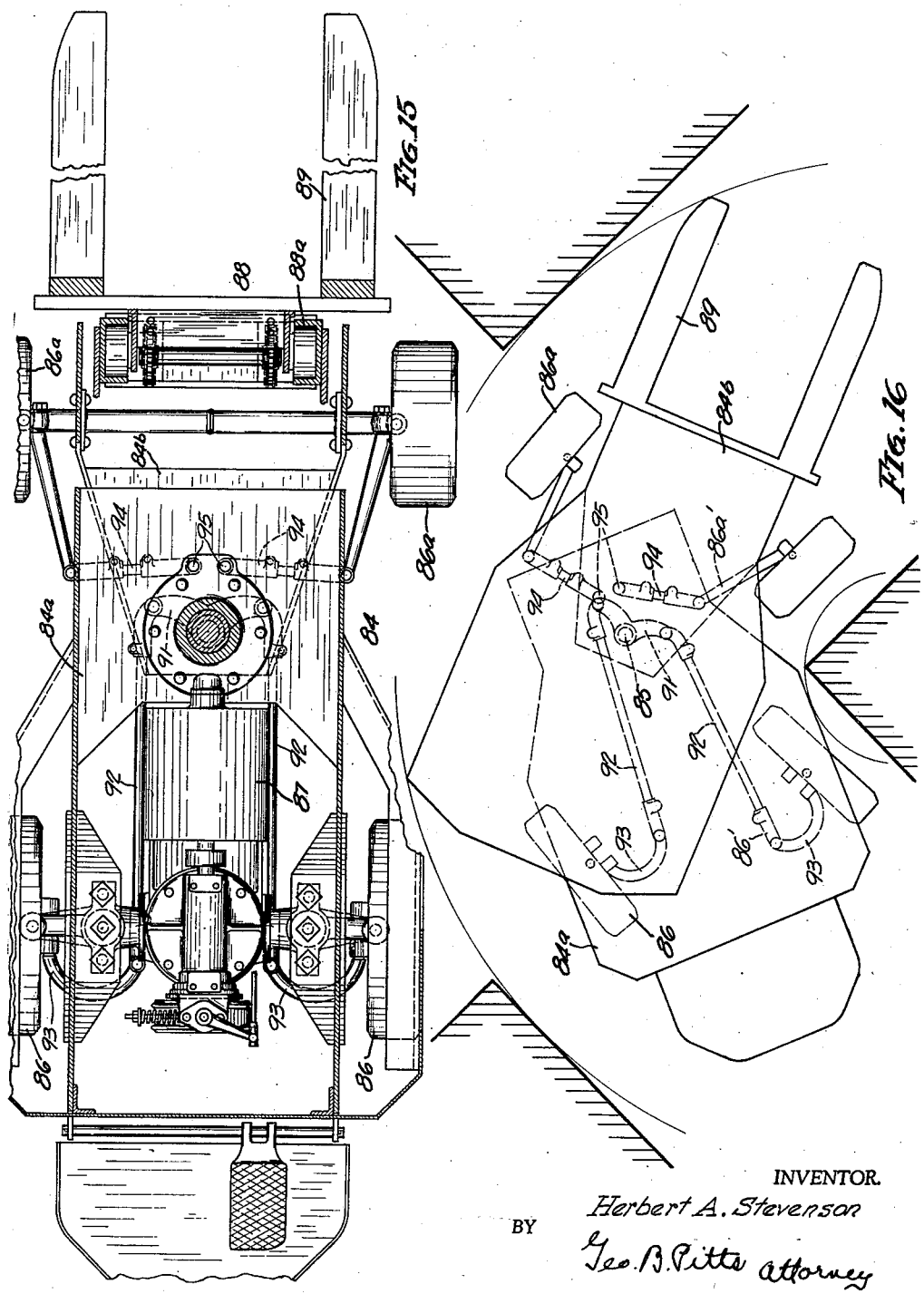
INVENTOR.
Herbert A. Stevenson
BY
Geo. B. Pitts attorney

UNITED STATES PATENT OFFICE 2,284,237

INDUSTRIAL TRUCK

Herbert A. Stevenson, Grosse Pointe Park, Mich.

Application June 7, 1940, Serial No. 339,309

19 Claims. (Cl. 214—113)

This invention relates to an industrial truck for use in (a) transporting goods, plant equipment and supplies in industrial plants, (b) loading and unloading platforms, freight cars and other carriers, and (c) handling, storing and stacking goods and materials in warehouses and other places of storage or removal of them therefrom.

In trucks of this general character, of which I have knowledge, due to the necessary equipment thereof, including the travel motor and its power unit, difficulty has been experienced in providing a steering arrangement making it possible to employ these trucks under a wide range of varying conditions. In installing a truck in a plant, it is customary to survey all aisles, travel lanes therein, loading and unloading areas, platforms, ramps and door ways and the accessibility thereof, to determine the areas available for steering a truck and turning it around, and maneuvering it into pick-up and discharging positions where the truck is equipped with a load raising and lowering mechanism. To meet these predetermined conditions, in some instances the trucks have been provided with relatively small steerable wheels and in other instances the truck frame or elevator guide walls have been cut away to permit a greater angular movement of the steerable wheels, and while it has been customary in trucks of this character to provide a minimum wheel base consistent with the equipment therefor and specified operations to be effected, all of these arrangements have been found inadequate to permit turning and maneuvering of the truck where limited areas prevail.

One object of the invention is to provide an improved truck of this character adapted to facilitate and increase the range of maneuverability of the truck, to meet various operating conditions, including aisles or lanes having limited spaces at turns and corners, narrow platforms and other restricted areas.

Another object of the invention is to provide an improved truck of this character having pivotally connected, relatively movable, wheel mounted frame sections and operating elements between the sections to control their relation end to end and angularly whereby steering of the truck during travel to make short turns and maneuvering thereof in limited or restricted areas, is facilitated.

Another object of the invention is to provide an improved truck of this character wherein its steering means are incorporated with the truck frame in such manner that the front and rear supporting wheels may be related for maneuvering or for steering during truck travel, whereby steering or turning of the truck may be effected in a relatively small area.

Another object of the invention is to provide an improved truck having a minimum number of supporting wheels and a frame supported at its opposite ends by the wheels, the frame comprising sections pivotally connected between the frame supporting wheels to permit lateral horizontal movement of the connected ends of the frame sections to dispose the wheels at opposite ends of the frame in steering relation.

A further object of the invention is to provide an improved industrial truck, having a frame mounted at its opposite outer ends on steerable wheels and comprising sections pivotally connected at their inner end portions which are swingable laterally and connected through linkage with said wheels to simultaneously swing the latter therewith, whereby said frame sections and wheels co-operate to effect steering or turning of the truck in a minimum area.

A still further object of the invention is to provide an improved truck of this character of simple construction and capable of being readily steered and maneuvered.

Other objects of the invention will be apparent to those skilled in the art to which my invention relates from the following description taken in connection with the accompanying drawings, wherein Fig. 1 is a side elevation of a truck embodying my invention, parts being broken away.

Fig. 2 is a plan view and showing in dotted lines the steering of the truck around a corner at an intersection.

Fig. 2a is a section on the line 2a—2a of Fig. 4.

Fig. 3 is an end elevation, parts being broken away.

Fig. 4 is a fragmentary section on the line 4—4 of Fig. 1.

Fig. 5 is a side elevation, parts being broken away, showing a different embodiment of the invention.

Fig. 6 is an end elevation of the construction shown in Fig. 5, parts being broken away.

Fig. 7 is a fragmentary plan view of the construction shown in Figs. 5 and 6, parts being broken away.

Fig. 8 is a fragmentary view of parts shown in Fig. 7, enlarged.

Fig. 9 is a side elevation of another modified form of construction, parts being broken away.

Fig. 10 is a fragmentary view of parts shown in Fig. 9, enlarged.

Fig. 11 is a plan view of parts shown in Fig. 10, parts being broken away.

Figure 1:
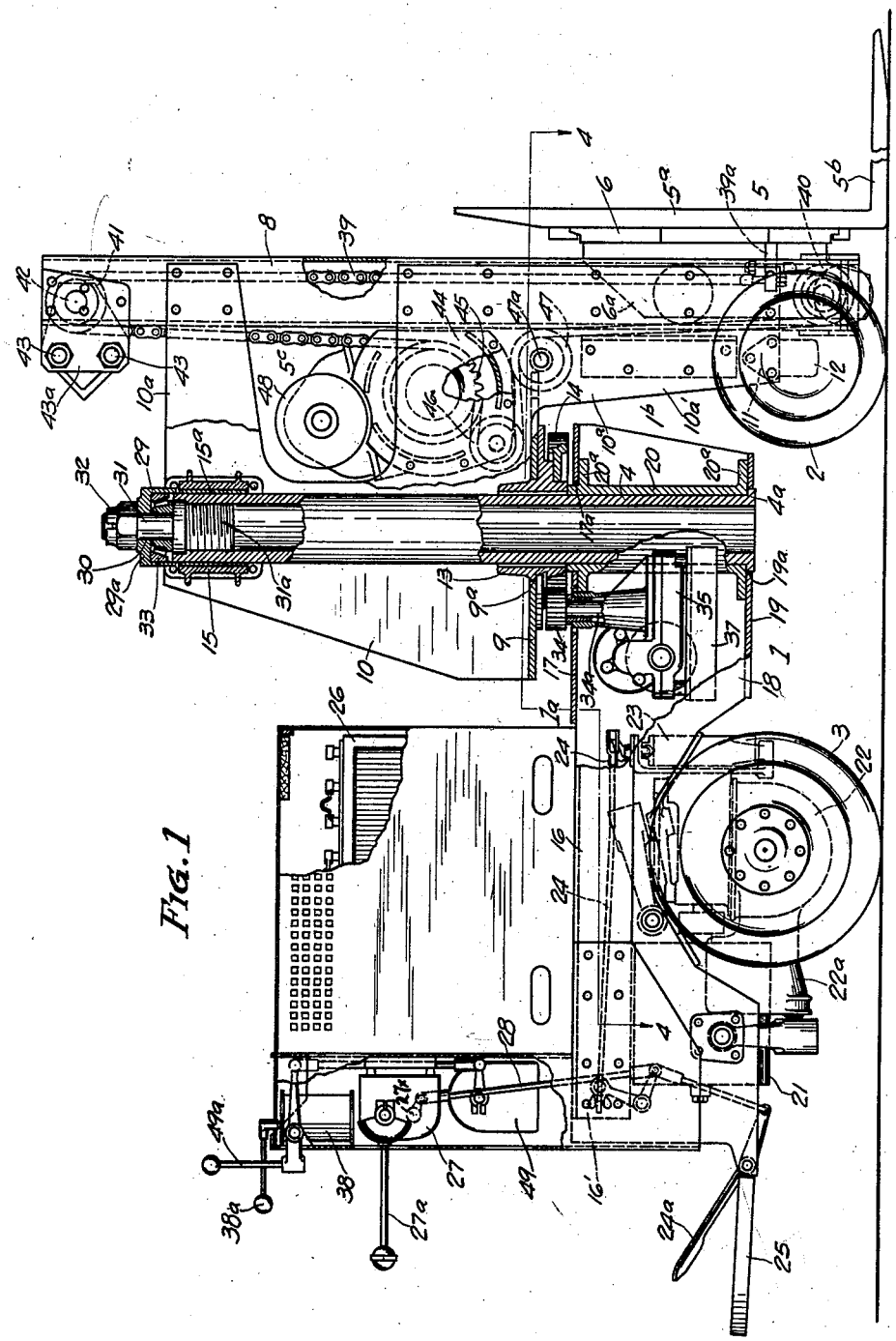

Figs. 12 and 13 are fragmentary sections on the lines 12—12 and 13—13, respectively of Fig. 10.

Fig. 14 is a section on the line 14—14 of Fig. 11.

Fig. 14a is an enlarged sectional view of control box 24.

Fig. 15 is a horizontal section of another modified form of construction, wherein the truck frame sections are mounted on steerable wheels.

Fig. 16 is a diagrammatic view showing the position of the frame sections and parts when positioned for steering about an intersection or corner.

Fig. 17 is a fragmentary side view, partly in section, of parts shown in Fig. 15.

Fig. 18 is a section on the line 18—18 of Fig. 17.

In the drawings, referring particularly to Figs. 1 to 4, inclusive, 1 indicates as an entirety a frame supported at its opposite ends by wheels 2, 3. The frame 1 comprises two sections, indicated as entireties at 1a, 1b, pivotally connected together at their inner ends by a vertically disposed pivot 4, the axis of which intersects an imaginary line extending longitudinally midway between the supporting wheels, this arrangement permitting the frame sections to articulate relative to each other in horizontal planes for steering during travel and in maneuvering into load pick-up and discharging positions. I preferably provide a pair of wheels for each section. In the form of construction now being referred to each pair of wheels has a fixed relation to and swings with the adjacent frame section, but as later set forth the supporting wheels for either section or all of the wheels may be swingably mounted and operated simultaneously with the frame sections.

In trucks having rigid frames and steering wheels at one or both ends of the truck, turning thereof is about a point remote from the truck, whereas in my form of construction the turning point is brought into very close relation to the truck, with the result that the turning area is materially reduced to permit turning in aisles and lanes and other areas under conditions which could not be met in trucks now in use. This steering capability is particularly advantageous for trucks equipped with load carrying or load raising and lowering mechanism, one example of such a truck being disclosed herein for illustrative purposes. Accordingly, trucks embodying my invention are adapted to adequately meet a wide range of operating conditions and in some instances make it possible to eliminate supplemental equipment in the handling of goods and equipment in manufacturing plants and places of storage.

The frame sections 1a, 1b are not only pivotally connected at their inner ends to permit of their articulation from their normal end to end relation into various angular relations for steering, but are also connected by co-acting operating elements (one of which may be power operated) which (a) when in operation serve to swing the frame sections from their normal position into any desired angular relation laterally in either direction and back again at the will of the operator for steering the truck and (b) when in a state of rest lock the sections against relative swinging movement in either direction, in normal or any angular relation to which they have been moved, whereby driving and maneuvering of the truck in rectilinear and curvilinear directions are controlled.

The operating elements may be operated manually by a wheel, or other device, but are preferably power operated (that is, one element is operated by a suitable power means), as later set forth.

In the form of frame construction now referred to and chosen for illustration the outer end of the frame section 1b is provided with a load handling mechanism, which may consist of one pair of guides or a plurality of extensible guides having a device or carrier, indicated as an entirety at 5, mounted for movement vertically. The carrier 5 is shown as consisting of upright members 5a and outwardly extending forks 5b, but the carrier may be otherwise constructed to adapt it to any kind or shape of the loads to be handled. The carrier 5 is secured to upper and lower cross members 6 having at their opposite sides inwardly extending brackets 6a. Each bracket 6a is provided with outwardly extending upper and lower stud shafts for rollers 7, which engage vertically disposed guides 8, whereby the carrier 5 may be raised and lowered by an elevating mechanism indicated as an entirety at 5c.

The frame section 1b comprises a base plate 9 which, at its inner end, extends over the inner end portion of the frame section 1a. The base plate 9 is provided with upwardly extending side plates 10, which extend outwardly as shown at 10a and also downwardly forwardly of the section 1a, as shown at 10a', the outer ends of the extensions 10a, 10a' being connected to the guides 8 to support the latter on the frame section 1b. At their lower ends, the extensions 10a' are rigidly secured to lugs 11 integrally connected to an axle 12 for the wheels 2. The base plate 9 is formed with an opening 9a in which is rigidly secured a collar 13, the inner wall of the latter forming a bearing for the pivot 4. The lower end of the collar 13 is provided with a seat in which an operating element 14 is secured. In the preferred form of construction the element 14 consists of a gear (later referred to) surrounding and in concentric relation to the axis of the pivot 4.

At their upper ends, the side plates 10 are connected together by a cross member 15 having a centrally disposed vertical opening 15a the wall of which forms a bearing for the upper end of the pivot 4.

The frame section 1a comprises outer parallel side bars 16 connected at their outer ends by an end bar 16' and having inwardly extending converging extensions 16a supporting a plate 17 in a plane below the gear 14, inner parallel side members 16b, side plates 18 to which the bars 16a and 16b are connected, and a plate 19 supported by the side plates 18 below the plate 17. As shown in Fig. 1, the plates 17, 19, are disposed in spaced, parallel relation and overlap the plate 9 of the section 1b. The plates 17, 19, are formed with alined openings 17a, 19a, respectively, through which the pivot 4 extends. 20 indicates a tubular member extending between the plates 17, 19, and in axial relation to the openings therein. The inner wall of the member 20 serves as a bearing for the pivot 4 in the frame section 1a. The member 20 is provided at its opposite ends with flanges 20a, which are rigidly secured to the plates 17, 19, in any desired manner.

The wheels 3 are driven by a motor 21 to effect travel and maneuvering of the truck. The motor 21, which is preferably of the electric type, is connected through a suitable power transmitting mechanism to axle sections, which are connected to the wheels 3 in any well known manner. The power transmitting mechanism and axles for the wheels 3 are enclosed in a housing 22 having at one side a cradle 22a in which the motor 21 is mounted. The housing 22 and cradle 22a are preferably connected to the side plates 18 in the same manner as like parts disclosed in Letters Patent No. 1,628,145, dated May 10, 1927, to Edward H. Remde and John H. Hertner. The inner end of the driven shaft for the power mechanism is provided with a drum for a suitable brake mechanism 23, the brake shoe elements of which are normally maintained in engagement with the drum by a spring 23a. The brake shoe elements are connected by linkage 24 to a foot operated pedal 24a, associated with a driver's platform 25, so that the driver, when mounting the platform for operating the truck, may stand thereon with one foot on the pedal and thus release the brake shoe elements and maintain them released so long as operation of the truck continues; this arrangement serving to automatically apply the brake shoe elements to the drum when the driver dismounts from the platform.

The supply of power to the power transmitting mechanism in the housing 22 may be of any desired form. Industrial trucks, of which I have knowledge, have been provided either with internal combustion motors connected through a suitable transmission to the power transmitting mechanism, with power plants for generating electric energy for an electric motor which in turn drives the power transmitting mechanism or with storage batteries for supplying electric energy to the electric motor, this latter form of power supply being chosen for illustration, and consisting of a battery 26 mounted on the side members 16. 27 indicates a controller for the motor 21, operated by a handle 27a. 28 indicates linkage connected to and operated by the linkage 24 and interconnected to the controller 27, so that the latter can only be operated to supply current to the motor 21 upon release of the brake shoe elements of the brake 23.

The pivot 4 between the frame sections 1a, 1b, preferably comprises a cylinder provided at its lower end with a flange 4a arranged to engage the lower end of the tubular member 20. The pivot 4 is supported at its upper end by the cross member 15 in the following manner: 29 indicates a cap member peripherally engaging the upper end walls of the opening 15a, the top wall 29a of the cap member 29 being formed with an axially disposed opening 30 through which a shaft 31 extends. The outer end of the shaft 31 is threaded to take a nut 32 which engages with the top wall 29a of the cap member 29. At its inner end the shaft 31 is enlarged to form a head 31a, the external wall of which is provided with screw threads engaging the internal screw threaded wall of the pivot 4 to connect the shaft 31 to the pivot 4. The upper end of the head 31a and inner walls of the cap member 29 form seats for the races of a tapered roller thrust bearing 33.

34 indicates an operating element, consisting of a pinion, on the frame section 1a in mesh with the operating element 14 for co-action therewith, as already set forth. The pinion 34 is fixed to a shaft 34a, which is preferably driven through a suitable gear reduction, in a casing 35, by a motor 36. The casing 35, which also encloses the extended end of the motor shaft, is supported by a bracket 37 on the inner side of the adjacent side plate 18. By preference, the outer end of the shaft 36a of the motor 36 is provided with a disk 36b normally engaged by a non-rotative, spring operated annular member 36c, the disk and member serving as brake elements to prevent rotation of the motor shaft 36a and to stop it when current to the motor 36 is shut off. The member 36c is formed of magnetic material, so that the magnetic influence of a coil 36d, which is connected in series with the motor circuit, releases the member 36b from the disk 36a, when current is supplied to the motor 36 and permits re-engagement of the member 36b with the disk 36a when the current to the motor is cut off.

The motor 36 is supplied with current from the battery 26, such supply being controlled by a suitable controller 38, which is operated by a handle 38a. When the pinion 34 is operated in either direction, the co-action thereof with the gear 14 serves to swing the inner ends of the frame sections 1a, 1b, laterally, to dispose them in angular relation, so that during truck travel the axis of the wheels at one end of the truck frame assume an angular relation with respect to the axis of the wheels at the opposite end of the truck frame, whereby turning or steering results about a long or short radius dependent upon the angularity given to the frame sections. The operation of steering the truck at an intersection of the lanes A, A', is shown in dotted lines in Fig. 2.

The raising and lowering mechanism 5c preferably comprises the following: 39 indicates a pair of endless sprocket chains connected to a plate 39a which is secured at its opposite ends to the brackets 6a. The chains 39 engage with and run around one pair of sprockets 40 loosely mounted on stud shafts extending inwardly from the guides 8 adjacent their lower ends and a pair of sprockets 41 at the upper ends of the guides 8, the sprockets 41 being loosely mounted on the opposite ends of a shaft 42, which is supported by a pair of plates 42a. The plates 42a are supported by a pair of rods 43, which are secured at their opposite ends to brackets 43a extending inwardly from the guides 8. From the guide sprockets 41, the chains extend into a casing 44 for engagement with sprockets 45 and then engage sprockets 46 loosely mounted on shafts supported by the walls of the casing 44 and sprockets 47 loosely mounted on a shaft 47a supported by the side members 10a; the latter sprockets guide the chains to the sprockets 40. The sprockets 45 are fixed to the opposite ends of a shaft (not shown) which is driven through a suitable reduction gear in the casing 44 by a motor 48.

The motor 48 is supplied with current from the battery 26, such supply being controlled by a controller 49, which is operated by a handle 49a. When the motor 48 is driven in one direction the chains serve to raise the carrier 5 and when the motor 48 is driven in the opposite direction the carrier is lowered. Limit switches (not shown) may be employed to stop the motor 48 when the carrier 5 reaches a predetermined position in moving in either direction.

Figs. 5, 6, 7 and 8 illustrate a different embodiment of the invention. Referring to these views, 1x indicates as an entirety the truck frame comprising sections 1ax, 1bx, mounted on pairs of wheels 3x, 2x, respectively, and having overlapping inner end portions, as later set forth, pivotally connected together by a pivot 4x, whereby the sections may be articulated or angularly related for steering and maneuvering.

In this form of construction, the frame section 1ax is substantially similar to the frame section 1a, for which reason a description thereof need not be repeated. The upper and lower plates 17x, 19x, of the frame section 1ax are formed with alined openings in which are seated the opposite ends of a tubular member 20x, the inner walls of the latter forming the bearing for the pivot 4x. The tubular member is provided with flanges 20x', which are rigidly secured to the inner faces of the plates 17x, 19x, whereby the tubular member reinforces and serves as a spacer for the plates.

The power supply shown at 26x is preferably similar to that already referred to, so that the wheels 3x are driven by an electric motor 21x, supplied with current from the battery 26x. The battery 26x is mounted on the frame section 1bx, as later set forth. Also, the casing 22x for the power transmitting mechanism is reversed to support the motor 21x inwardly of the wheels 3x and the brake mechanism 23x outwardly thereof, such arrangement and the connection of the casing with the adjacent frame section being similar to a like construction disclosed in the aforesaid patent.

The frame section 1bx comprises a pair of side members 50 having alined upper and lower alined arms 51, 52, which extend inwardly in planes above and below and beyond portions of the frame section 1ax. The lower pair of arms 52 are fixed to and support a plate 52a later referred to. At their lower outer ends, the side members 50 are former with openings 50x through which the axle 2x' for the wheels 2x extend, the marginal walls of the openings 50x being rigidly secured to flanges 2x'' integrally connected to the axle 2x'. The upper pair of arms 51 support upper and lower plates 51a, 51b, and may also support at their outer ends a pair of uprights 53 to which reference will later be made.

The upper plate 51a supports the battery 26x, whereas the lower plate 51b and the plate 52a are formed with openings through which the opposite ends of the pivot 4x extend. The opposite ends of the pivot 4x are mounted to collars 54, which are welded or otherwise secured to the top and bottom faces of the plate 51b, 52a.

14x indicates an operating element arranged between the plates 17x and 51b and fixed to the latter plate in any preferred manner. By preference, the operating element 14x consists of a gear surrounding and concentrically related to the pivot 4x, secured by bolts 54x to the plate 51b so as to rotate with the pivot and to move as a unit with the frame section 1bx, as later set forth.

34x indicates an operating element, consisting of a pinion, on the frame section 1ax and in mesh with the operating element 14x for co-action therewith, as already set forth. The pinion 34x is fixed to a shaft 34a', which is driven through a suitable gear reduction, in a casing 35x by a motor 36x. The casing 35x, which encloses the extended end of the motor shaft, is supported by brackets 37x on the inner side of the adjacent side plate 18x and plate 19x (see Fig. 5).

The motor 36x is supplied with current from the battery 26x, such supply being controlled by a suitable controller 38x, which is operated by a handle 38x'. When the pinion 34x is driven in either direction, the co-action thereof with the gear 14x serves to swing the inner ends of the frame sections 1ax, 1bx, laterally, to dispose them in angular relation, so that during truck travel or maneuvering the axis of the wheels at one end of the truck assume an angular relation with respect to the axis of the wheels at the opposite end of the truck, whereby turning or steering results about a long or short radius dependent upon the angularity given to the frame sections.

The load handling mechanism, indicated as an entirety at 55, is trunnioned on the frame section 1bx to position its guides 8x vertically or inclined upwardly and inwardly (see dotted lines in Fig. 5), so that during transportation of loads from place to place they may be supported inwardly of the wheels 2x for well known reasons, as well as to eliminate danger of displacement of the loads. In this arrangement I provide a pair of plates 56, which are rigidly secured to the outer sides of the guides 8x. The plates 56 extend inwardly from the guides 8x, as shown at 56a and support between them a power mechanism 57 for raising and lowering a carrier 5x, preferably by means of a pair of endless chains 58. The lower end portions of the plates are formed with openings 59 and alined with hollow bosses 59a (which are secured to the plates) to form bearings for trunnions 60 extending inwardly from the side members 50. The trunnions 60 are provided with flanges 60a which are rigidly secured to the side members 50. The power mechanism 57 for driving the chains 58, the carrier 5x and the mounting and guiding of the chains are similar in construction and operation to similar parts already described with respect to Figs. 1 to 4, inclusive, except that the shaft 61 for the sprockets 62, which guide the chains 58 to the sprockets 63 at the lower ends of the guides 8x, is mounted at its opposite ends in the side members 56. The motor 57a for the power mechanism 57 is supplied with current from the battery 26x, such supply being controlled by a controller 64 operated by a handle 64a.

The means for tilting the load handling mechanism 55 consists of a power mechanism 65 which may be mounted in any convenient position, but for purpose of illustration it is mounted between and secured to a pair of brackets 66, which are supported on the upper ends of the uprights 53, the power mechanism including a motor 65a supplied with current from the battery 26x. The supply of current to the motor 65a is controlled by a suitable controller 67 which is operated by a handle 67a. The power mechanism 65 is similar in construction to the power mechanism 57, except that the shaft driven thereby extends at its opposite outer ends beyond the casing for the power mechanism and each such end is provided with a crank disk 68 (instead of a sprocket). Each disk 68 is pivotally connected to the outer end of a rod 69 the opposite end of which is pivotally mounted on a stud shaft 70 projecting laterally from the adjacent guide 8x. From the foregoing description it will be understood that when the crank disks 68 are rotated in one direction the load handling mechanism 55 is bodily tilted about the trunnions 60 to swing the guides 8x to an inclined position (see dotted lines in Fig. 5) and when the crank disks are rotated in the opposite direction the mechanism 55 is bodily moved in the opposite direction to swing the guides into vertical position. It will also be understood that the carrier 5x may be raised and lowered by the mechanism 57 in either position of the guides 8x.

Figs. 9, 10 and 11 illustrate another modified form of construction. Referring to these views, 1x' indicates a truck frame comprising sections 1ax', 1bx', having inner overlapping portions pivotally connected by a pivot 4x'. The frame sections 1ax', 1bx' are substantially similar in construction to the frame sections 1ax', 1bx', and support a tiltable load handling mechanism indicated as entirety at 55x and tilting means therefor indicated as an entirety at 65x, this mechanism and means being preferably similar to the mechanism 55 and means 65 already referred to. In this form of construction, the operating element, indicated as an entirety at 14x' is carried by the frame 1bx' and is secured by bolts to the lower face of the plate 51b' and consists of an annular member having a hub 71, which fits the pivot 4x', and a skirt 71a provided on its periphery with rack engaging teeth, forming a pinion 72 arranged to be engaged by a rack 73. When the frame sections 1ax', 1bx' are in their normal or end to end relation for truck travel in a rectilinear direction, the intermediate portion of the rack 73 is in engagement with the pinion, so that movement of the rack in one direction or the other will serve to swing the sections about the pivot 4x' into an angular relation. The rack 73 is operated endwise in either direction by hydraulic means, indicated as an entirety at 74, as later set forth. To guide the rack 73, the tubular member 20x', which is mounted between the plates 17x', 19x', is enlarged at its upper end to form a chamber 75 to accommodate the operating element 14x' and at one side the side walls of the chamber are extended to form a guide-way 76 in which the rack 73 slides. The extended walls support a bearing member 76a having on its inner side a recess in which the rack 73 slides. The outer end of the rack 73 is connected to the inner end of a pitman 77, which extends through a cylinder 78. The opposite end walls of the cylinder are formed with openings to slidably support the pitman, the openings for the pitman being provided with suitable glands. Within the cylinder 78, the pitman is provided with a piston 78a, which is arranged intermediate the cylinder end walls for movement in either direction when the frame sections 1ax', 1bx' are in their normal position. Connections 79 for a fluid, for example, oil, lead from the opposite ends of the cylinder 78 to a suitable pump 80, which is driven by a motor 81. The motor 81 is supplied with current from the battery 26x', such supply being controlled by a switch 82, the movable arm of which is fixed to the shaft 27x of the controller 27 so that when the operator stands on the pedal 24a the switch is closed and the motor is started and continues to run until the operator dismounts from the platform and permits the pedal to swing upwardly, as already set forth, which upward movement opens the switch 82 and automatically stops the motor. The pump 80 is of the conventional type having a valve and a bypass. The valve is connected to a handle 82a, which in one operated position connects the outlet from the pump with one conduit 79 and the inlet to the pump with the other conduit 79 and in its other operated position these connections are reversed, the by-pass providing for the flow of the fluid to the intake side of the pump when the valve is in neutral position to permit continuous operation of the motor 81. In this arrangement the movement of the piston 78a in either direction is controlled to effect steering of the truck. The cylinder 78 may be secured to the frame section 1ax' in any desired manner, but I prefer to provide its outer end wall with a plate 83 having a laterally extending arm the outer end of which is provided with a sleeve 83a. The sleeve 83a surrounds a pin 84, supported between the flanges of a bracket 85 secured to the adjacent side members of the frame section 1ax'. The pump 80 may consist of geared together shafts 80a one thereof being connected to the shaft of the motor 81 and pump elements on the shafts 80a to effect flow of the oil under pressure.

Figs. 15, 16 and 17 illustrate another modification. In these views the truck frame 84 comprises sections 84a, 84b, having overlapping inner end portions which are pivotally connected by a pivot 85. The pivot 85 is mounted on its opposite ends in collars 85a suitably fixed to the plates 51b and 52a and splined to the operating element 14x (which is bolted to the plate 51b, as already set forth), for a reason later apparent. The supporting wheels for either frame sections 84a, 84b may be mounted for swinging movement relative to the adjacent frame section to co-operate with the articulation of both sections to effect steering about a center in close relation to the truck frame, but by preference both pairs of wheels are steerably mounted and swingable simultaneously with the frame sections, the result being that the truck may be turned about a materially reduced radius, as shown in Fig. 16. In this preferred arrangement, the outer end of the section 84a is supported on knuckle mounted, steerable wheels 86 and the outer end of the section 84b is supported on knuckle mounted, steerable wheels 86a. The axle section for the spindles of the wheels 86 are drivingly connected to a motor 87. The motor 87, and the housings for the power transmitting mechanism and axle sections are preferably constructed and mounted on the frame section 84a similarly to like parts shown in the aforesaid patent. The frame sections 84a, 84b mount a load handling mechanism 88, having guides 88a for a carrier 89. The mechanism 88 may be similar to that shown in Fig. 1, but for illustrative purposes the mechanism is similar to that shown in Fig. 5, being mounted on trunnions 90 (one only being shown).

The steering connections 86' for the wheels 86 are connected to the inner end portion of the frame section 84b and the steering connections 86a' for the wheels 86a are connected to the inner end portion of the frame section 84a, whereby the swinging movement of the wheels for one section are controlled by the lateral movement of the remote section. The steering connections 86' comprise the following: 91 indicates a bell-crank, the hub of which is seated on and fixed to the reduced lower end of the pivot 85 so as to rotate therewith, the arms of the bell-crank being of equal length and extending laterally to either side of an imaginary line extending longitudinally of the section 84b and cutting the axis of the pivot 85. The outer end of each bell-crank arm is pivotally connected to the inner end of a link 92, the outer end of which is pivotally connected to an arm 93, the latter being secured to the spindle for the adjacent wheel 86. The steering connections 86a' comprise the following: 94, 94 indicate a pair of links the inner ends of which are respectively pivoted on stud shafts 95 depending from the plate 19x of the frame section 84a, the stud shafts 95 being spaced equal distances from an imaginary line extending longitudinally of the frame section 84a midway between the wheels 86. The outer end of each link 94 is pivotally connected to an arm 96 which is fixed to the spindle for the adjacent wheel 86a.

In my form of construction, the truck frame is wheel supported at its opposite ends and formed of sections pivoted together at their adjacent ends between the supporting wheels. In this arrangement, one end may be utilized for carrying loads and the other end for the driver's station; and by the provision of co-acting elements the sections may be moved into an angular relation for steering the truck and when moved into the desired angular relation the elements prevent relative movement of the frame sections in either direction, so that guiding and steering of the truck is positively controlled. As already pointed out, the provision of a frame supported at its opposite ends on wheels comprising sections pivotally connected together between the wheels, permits the truck to be steered on a relatively short radius and by mounting the frame sections on steerable wheels the turning radius is materially shortened. It will be noted that in the disclosures herein having load lifting and carrying mechanisms, the power supply is disposed on that side of the pivot between the frame sections remote from such mechanism to serve as a counterbalance.

Due to the fact that this type of truck is usually employed for carrying heavy loads it is preferable to effect articulation of the frame sections by power, as it facilitates the steering operations and permits the truck to be driven at its maximum rated speeds with and without loads when desired.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

What I claim is:

1. In an industrial truck, the combination of a frame comprising a main section and a separate section, said sections having overlapping inner end portions, a pivot for pivotally connecting said inner end portions together, power means on one of said sections, a pair of wheels adjacent the outer end of each frame section arranged to co-operate with the pair of wheels for the other frame section to support said frame, certain of said wheels being drivingly connected to said power means, a load carrier mounted to move upwardly and downwardly on one of said frame sections outwardly of the inner end portion of the other frame section, power means on one of said sections for operating said carrier, means interconnected between the inner connected ends of said frame sections for swinging them laterally about their pivotal connection for steering the truck, and devices for controlling the operation of each of said power means and said swinging means.

2. In an industrial truck, the combination of a frame comprising a main section and a separate section, the inner ends of said sections being disposed in overlapping relation, a pivot for pivotally connecting said inner ends together, a pair of non-steerable wheels fixedly related to and supporting each section and arranged to co-operate with the other pair of wheels to support said frame, power means on one of said sections drivingly connected to the wheels for said section, a load carrier on said separate section outwardly of the inner end of said main section, means interconnected to the inner connected ends of said frame sections for swinging them laterally about their pivotal connection for steering the truck, and devices for controlling said swinging means and said power means.

3. In an industrial truck, the combination of a frame comprising a main section and a separate section, said sections having overlapping inner end portions, a pivot for pivotally connecting said inner and portions together, a pair of wheels fixedly related to each of said sections adjacent the outer end thereof and arranged to co-operate with the pair of wheels for the other section to support said frame, power means on one of said sections drivingly connected to the wheels for said section, a load carrier mounted to move upwardly and downwardly on one of said sections outwardly of the inner end portion of the other section, power means on one of said sections for operating said carrier, means for swinging said frame sections laterally about their pivotal connection for steering the truck, and devices for controlling each of said power means and said swinging means.

4. An industrial truck as claimed in claim 1 wherein the swinging means includes a gear fixed to one of said sections concentric to the axis of the pivotal connection between them and a pinion mounted on the other section meshing with said gear.

5. An industrial truck as claimed in claim 1 wherein the swinging means are hydraulically operated.

6. In an industrial truck, the combination of a frame comprising a main section and a load carrying section, a pair of traction wheels fixedly related to said main section, a pair of wheels fixedly related to said load carrying section and co-operating with said first mentioned pair of wheels to support said frame, the inner ends of said sections having an overlapping relation and provided with bearings disposed substantially midway between said pairs of wheels, a pivot extending through said bearings for pivotally connecting said sections together, means for driving said traction wheels, a load handling mechanism mounted on said load carrying section outwardly of the inner end of said main section, said frame sections being normally disposed in end to end relation for truck travel in rectilinear directions, means interconnected to the inner ends of said frame sections for swinging them into an angular relation for truck travel in curvilinear directions, and power supply means for said mechanism and said driving means mounted on one of said frame sections on that side of the pivot remote from said load handling mechanism.

7. An industrial truck as claimed in claim 6 wherein that portion of the load carrying frame which overlaps the other frame section extends beyond the pivot between said sections and supports the power supply means for said mechanism.

8. In an industrial truck, the combination of a frame comprising pivotally connected sections, power means on one of said sections, a pair of wheels for supporting each section, one of said pairs of wheels being drivingly connected to said power means and one of said pairs of wheels having knuckle mounted spindles, linkages, each connected at its outer end to one of the knuckle mounted wheel spindles for swinging the adjacent wheel relative to the adjacent frame section, the inner ends of said linkages being pivotally connected to the other frame section at opposite sides of an imaginary line extending longitudinally of said other frame section midway between the wheels therefor, means for swinging the connected ends of said frame sections laterally about their pivotal connection, and a device for controlling the operation of said power means.

9. In an industrial truck, the combination of a frame comprising pivotally connected sections, power means on one of said sections, a pair of knuckle mounted wheels for supporting each section, certain of said wheels being drivingly connected to said power means, steering connections between the supporting wheels for each frame section and the other frame section, means for swinging the connected ends of said frame sections laterally about their pivotal connection, and devices for controlling the operation of said swinging means and said power means.

10. In an industrial truck, the combination of a frame comprising pivotally connected sections, a pair of knuckle mounted wheels for supporting each section, power means on one of said frame sections drivingly connected to the wheels for said section, a load carrier on the other frame section, linkages between said driven wheels and the frame section for said load carrier, linkages between the wheels for said load carrier frame section and the remote frame section, means for swinging the connected ends of said frame sections about their pivotal connection, and devices for controlling the operation of said swinging means and said power means.

11. In an industrial truck, the combination of a frame comprising pivotally connected sections, a pair of wheels for supporting each of said frame sections, one of said pairs of wheels being knuckle mounted on the adjacent frame section, operating connections between said knuckle mounted wheels and the remote frame section, power means on one of said sections drivingly connected to certain of said wheels, means for swinging said frame sections laterally about their pivotal connection and simultaneously swinging said knuckle mounted wheels, and devices for controlling the operation of said swinging means and said power means.

12. In an industrial truck, the combination of a frame comprising a main section mounted at its outer end on a pair of traction wheels and a load carrying section consisting of an upright portion disposed forwardly of the inner end of said main frame section and having inwardly extending members disposed above and below the inner end portion of said main frame section, wheels for supporting said load carrying section, means for driving said traction wheels, a pivot extending through said main frame section and said inwardly extending members of said load carrying section for pivotally connecting said frame sections together, a load carrier on the upright portion of said load carrying section, means for swinging said frame sections into angular relation for truck travel in curvilinear directions, and power supply means on one of said frame sections for said driving means.

13. In an industrial truck, the combination of a frame comprising a main section mounted at its outer end on a pair of traction wheels and a load carrying section consisting of an upright portion disposed forwardly of the inner end of said main frame section and having an inwardly extending member disposed above the inner end portion of said main frame section, wheels for supporting said load carrying section, means for driving said traction wheels, a pivot member rotatably supported at its lower end in said main frame section and connected to said inwardly extending member and the upright portion of said load carrying section for pivotally connecting said frame sections together, a load handling mechanism carried by the upright portion of said load carrying section, means for swinging said frame sections into angular relation for truck travel in curvilinear directions, and power supply means on one of said sections for said driving means, said swinging means and said load handling mechanism.

14. In an industrial truck, the combination of a frame comprising a main section and a separate section, the inner end of said separate section being disposed above and having overlapping relation to the inner end of said main section, a pair of wheels for supporting each frame section, a pivot disposed substantially midway between said pairs of wheels for pivotally connecting the overlapping portions of said frame sections together, whereby lateral movement of said overlapping portions serves to effect steering of the truck on said pairs of wheels, a load carrier on said separate section outwardly of the inner end portion of said main section, means for driving one of said pairs of wheels, means for swinging said overlapping portions of said frame sections laterally in either direction, and power supply means on the overlapping portion of said separate section on that side of said pivot between said overlapping portions remote from said load carrier.

15. In an industrial truck, the combination of a frame comprising a main section and a separate section, the inner end of said separate section being disposed above and having overlapping relation to the inner end of said main section, a pair of wheels fixedly related to and supporting each of said frame sections, a pivot disposed substantially midway between said pairs of wheels for pivotally connecting the overlapping portions of said frame sections together, whereby lateral movement of said overlapping portions serves to effect steering of the truck on said pairs of wheels, a load carrier on said separate section outwardly of the inner end portion of said main section, means for driving one of said pairs of wheels, means for swinging said overlapping portions of said frame sections laterally in either direction, and power supply means on the overlapping portion of said separate section on that side of the pivot between said overlapping portions remote from said load carrier.

16. In an industrial truck, the combination of a frame comprising of a main section and a load carrying section consisting of a main portion disposed above the inner end of said main section and another portion disposed beyond the inner end thereof, a pair of traction wheels fixedly related to and supporting said main section, a pair of wheels fixedly related to and supporting said load carrying section, means for driving said traction wheels, a pivot extending through the inner end portion of said main section and the main portion of said load carrying section for pivotally connecting said frame sections together, a load carrier on said other portion of said load carrying section, means for swinging the inner end of said main frame section and the main portion of said load carrying section laterally to position said frame sections into angular relation for truck travel on said pairs of wheels in curvilinear directions, and power supply means for said driving means and said swinging means, mounted on the main portion of said load carrying section on that side of said pivot remote from said carrier.

17. In an industrial truck, the combination of a unitary frame comprising a main section and a load carrying section, the latter section consisting of a substantially upright member extending above and below said main section and upper and lower members extending inwardly from said upright member, pivotal connections between said upper and lower members and the inner end portion of said main section, to permit swinging of said sections into angular relation, a pair of wheels fixedly related to and supporting each of said frame sections and co-operating through said pivotal connections with the other pair of wheels to support said frame for travel in rectilinear and curvilinear directions, power means on said main section for driving the supporting wheels therefor, and a load handling mechanism, said mechanism comprising a carrier slidably supported by and movable vertically on said upright member and power means on one of said frame sections for operating said carrier.

18. In an industrial truck, the combination of a unitary frame comprising a main section and a load carrying section, the latter section consisting of a substantially upright member extending above and below said main section and upper and lower members extending inwardly from said upright member, pivotal connections between said upper and lower members and the inner end portion of said main section, to permit swinging of said sections into angular relation, a pair of wheels fixedly related to and supporting each of said frame sections and co-operating through said pivotal connections with the other pair of wheels to support said frame for travel in rectilinear and curvilinear directions, power means on said main section for driving the supporting wheels therefor, a load handling mechanism comprising a carrier slidably supported by and movable vertically on said upright member and power means on said load carrying frame section for operating said carrier, and power supply means on the upper member of said load carrying section.

19. In an industrial truck, the combination of a unitary frame comprising a main section and a load carrying section, the latter section consisting of a substantially upright member extending above and below said main section and members extending inwardly from said upright member and disposed above and below and in overlapping relation to the inner end portion of said main frame section, pivotal connections between said inwardly extending members and the inner end portion of said main section, to permit swinging of said sections into angular relation, a pair of wheels fixedly related to and supporting each of said frame sections and co-operating through said pivotal connections with the other pair of wheels to support said frame for travel in rectilinear and curvilinear directions, power means on said main section for driving the supporting wheels therefor, a load handling mechanism, comprising a carrier slidably supported by and movable vertically on said upright member and power means on said load carrying frame section for operating said carrier, and power supply means on that inwardly extending member disposed above the inner end portion of said main frame section.

HERBERT A. STEVENSON.